(12) United States Patent
Copty et al.

(10) Patent No.: US 10,387,655 B2
(45) Date of Patent: Aug. 20, 2019

(54) METHOD, SYSTEM AND PRODUCT FOR USING A PREDICTIVE MODEL TO PREDICT IF INPUTS REACH A VULNERABILITY OF A PROGRAM

(71) Applicant: International Business Machines Corporation, Armonk, NY (US)

(72) Inventors: Fady Copty, Nazareth (IL); Ayman Jarrous, Shafa-amer (IL); Sharon Keidar-Barner, Megiddo (IL); Tamer Salman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 15/432,942

(22) Filed: Feb. 15, 2017

(65) Prior Publication Data

US 2018/0232523 A1 Aug. 16, 2018

(51) Int. Cl.
*G06F 21/57* (2013.01)
*G06N 7/02* (2006.01)
*G06F 21/53* (2013.01)

(52) U.S. Cl.
CPC ............ *G06F 21/577* (2013.01); *G06F 21/53* (2013.01); *G06N 7/023* (2013.01)

(58) Field of Classification Search
None
See application file for complete search history.

(56) References Cited

U.S. PATENT DOCUMENTS

| 8,516,584 | B2 | 8/2013 | Moskovitch et al. |
| 8,613,080 | B2 | 12/2013 | Wysopal et al. |
| 2010/0058475 | A1 | 3/2010 | Thummalapenta et al. |
| 2011/0030061 | A1* | 2/2011 | Artzi .................. G06F 11/3604 726/25 |
| 2016/0255110 | A1* | 9/2016 | Altman ................ H04L 63/145 726/23 |
| 2016/0259943 | A1* | 9/2016 | Murthy ................ G06F 21/577 |

OTHER PUBLICATIONS

Shar et al., "Web Application Vulnerability Prediction Using Hybrid Program Analysis and Machine Learning", IEEE Transactions on Dependable and Secure Computing, vol. 12, No. 6, Nov./Dec. 2015 (Year: 2015).*

(Continued)

*Primary Examiner* — Henry Tsang
(74) *Attorney, Agent, or Firm* — Ziv Glasberg

(57) ABSTRACT

A method, apparatus and product for using a predictive model to predict if inputs reach a vulnerability of a program. Given a sample input, which when provided to a program being executed, is configured to cause execution of the program to reach a vulnerability, a set of variant inputs and labels thereof is generated based on the sample input and execution of the program with each variant input. A predictive model is trained based on the set of variant inputs and labels thereof, and provided to an input analysis platform configured to analyze an input; whereby the input analysis platform is enabled to predict whether an input would cause the program to reach the vulnerability prior to executing the program with the input and perform a responsive action accordingly.

17 Claims, 6 Drawing Sheets

(56) References Cited

OTHER PUBLICATIONS

Zamani et al., "Machine learning techniques for intrusion detection", arXiv preprint arXiv:1312.2177, May 9, 2015.
Ashfaqa et al., "Fuzziness based semi-supervised learning approach for intrusion detection system", Information Sciences (2016).
Chunlei et al., "Automatic fuzz testing of web service vulnerability", International Conference on Information and Communications Technologies (ICT 2014), May 15-17, 2014.
Shar et al., "Web Application Vulnerability Prediction Using Hybrid Program Analysis and Machine Learning", IEEE transactions on dependable and secure computing, vol. 12, No. 6, Nov./Dec. 2015.

* cited by examiner

METHOD, SYSTEM AND PRODUCT FOR USING A PREDICTIVE MODEL TO PREDICT IF INPUTS REACH A VULNERABILITY OF A PROGRAM

TECHNICAL FIELD

The present disclosure relates to exploit vulnerability detection and prevention in general, and to exploit vulnerability prevention using supervised learning from fuzz testing and security analysis, in particular.

BACKGROUND

Malicious users, such as hackers, attempt to exploit vulnerabilities within computer program. For such reason, once a vulnerability is discovered, there is a race between hackers and developers. While the developers attempt to patch the computer program and distribute the patch to all instances of the computer program, the hackers attempt to exploit the vulnerability to hack instances of the computer program.

In some cases, the vulnerability is not announced and is kept in confidence until a patch is ready to be deployed. Such is the case in operating systems, such as iOS™ and Android™, where once a vulnerability is detected, the development team attempts to patch the system. Only once the patch is ready for distribution, the vulnerability is announced together with the announcement of a fix to the vulnerability. Naturally, such can only be the case if the vulnerability is detected by a non-malicious user who cooperate with the developers of the operating system. Moreover, once the patch is released, it may not necessarily be deployed for every computing device. As a result some devices may still be susceptible to the exploitation of the vulnerability even after the patch is made available.

BRIEF SUMMARY

One exemplary embodiment of the disclosed subject matter is a computer-implemented method comprising: obtaining a sample input, wherein the sample input, when provided to a program being executed, is configured to cause execution of the program to reach a vulnerability; generating a set of variant inputs based on the sample input; for each variant input in the set of variant inputs: executing the program with the variant input, to determine if execution of the program reaches the vulnerability; and labeling the variant input as vulnerable or non-vulnerable based on a result of said executing; training a predictive model based on the set of variant inputs and labels thereof; and providing the predictive model to an input analysis platform configured to analyze an input prior to execution thereof by the program; whereby the input analysis platform is enabled to predict whether an input would cause the program to reach the vulnerability prior to executing the program with the input.

Another exemplary embodiment of the disclosed subject matter is a computerized apparatus having a processor, the processor being adapted to perform the steps of: obtaining a sample input, wherein the sample input, when provided to a program being executed, is configured to cause execution of the program to reach a vulnerability; generating a set of variant inputs based on the sample input; for each variant input in the set of variant inputs: executing the program with the variant input, to determine if execution of the program reaches the vulnerability; and labeling the variant input as vulnerable or non-vulnerable based on a result of said executing; training a predictive model based on the set of variant inputs and labels thereof; and providing the predictive model to an input analysis platform configured to analyze an input prior to execution thereof by the program; whereby the input analysis platform is enabled to predict whether an input would cause the program to reach the vulnerability prior to executing the program with the input.

Yet another exemplary embodiment of the disclosed subject matter is a computer program product comprising a non-transitory computer readable storage medium retaining program instructions, which program instructions when read by a processor, cause the processor to perform a method comprising: obtaining a sample input, wherein the sample input, when provided to a second program being executed, is configured to cause execution of the second program to reach a vulnerability; generating a set of variant inputs based on the sample input; for each variant input in the set of variant inputs: executing the second program with the variant input, to determine if execution of the program reaches the vulnerability; and labeling the variant input as vulnerable or non-vulnerable based on a result of said executing; training a predictive model based on the set of variant inputs and labels thereof; and providing the predictive model to an input analysis platform configured to analyze an input prior to execution thereof by the second program; whereby the input analysis platform is enabled to predict whether an input would cause the second program to reach the vulnerability prior to executing the second program with the input.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
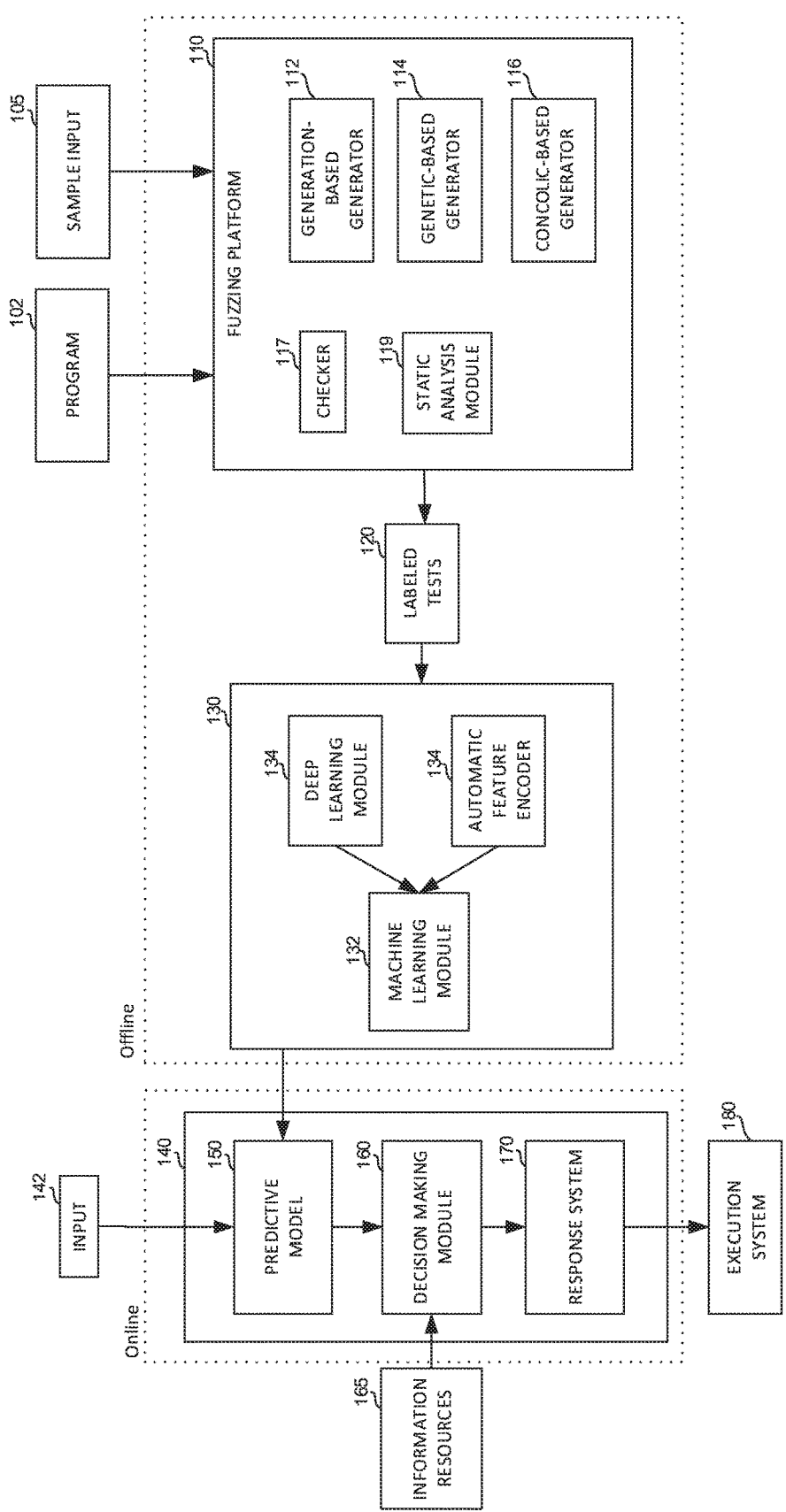
FIG. 1 shows a schematic illustration of an exemplary environment in which the disclosed subject matter may be utilized, in accordance with some exemplary embodiments of the disclosed subject matter.

One technical problem dealt with by the disclosed subject matter is to prevent exploit vulnerability attacks. In some exemplary embodiments, an exploit, such as a chunk of data, a sequence of commands, or the like, may take advantage of a vulnerability in a computerized system. The exploit may cause the computerized system to perform behavior that is unintended, undesired or unanticipated from the point of view of the developer of the computerized system. The exploit may be taken advantage of by malicious user to perform malicious activity and potentially compromising the security of the computerized system, such as gaining control of the computer system, allowing privilege escalation, accessing restricted data, or the like.

In some exemplary embodiments, the vulnerability may occur as a result of existence of a bug, a weakness, a design or implementation error, or the like, in the computerized system, such as in the software (e.g., program), in the underlying hardware, or in any other component thereof. As a non-limiting example, the disclosed subject matter is described with respect to a vulnerability in the program itself. However, it will be noted that the disclosed subject matter is not limited to such a case. The vulnerability may be exploited when a program reaches a certain location, but may be caused in view of the underlying hardware or other component.

In some exemplary embodiments, the vulnerability may be detected in the program. However, it may take weeks or months to release a patch for this vulnerability. In embedded or critical systems, the vulnerability may linger even longer. This may leave the computerized system exposed to hackers for a long time after it has been detected. Furthermore, even when a patch is released, some users may fail to promptly update their system. Additionally or alternatively, users may not apply patches due to system stability considerations.

One technical solution is to train a predictive model based on a predetermined vulnerability. The predictive model may be utilized to predict whether an input would cause a program to reach the vulnerability. The predictive model may be used by one or more input analysis platforms executing the program, to determine if an input comprises an exploit, prior to executing the program with the input, thus preventing malicious users from exploiting the vulnerability and non-malicious users from an unintended undesired behavior associated with the vulnerability.

In some exemplary embodiments, a sample input that causes the execution of the program to reach the vulnerability may be obtained. A set of variant inputs may be generated based on the sample input. Each variant input in the set of variant inputs may be executed with the program, to determine if execution of the program with the variant input would cause the program to reach the vulnerability. Each variant input in the set of variant inputs may be labeled as vulnerable or non-vulnerable based on a result of the execution. The predictive model may be trained based on the set of variant inputs and labels thereof.

In some exemplary embodiments, the set of variant inputs may be used in a supervised learning system that builds the predictive model. A deep learning technique may be applied to automatically identify features of the inputs to be used by the supervised learning system. In some exemplary embodiments, supervised learning system may utilize an autoencoder neural network to identify the features.

In some exemplary embodiments, the predictive model may be provided to an input analysis platform that is configured to analyze the input prior to the execution thereof by the program. The input analysis platform may be enabled, using the predictive model, to predict, prior to executing the program, whether an input would cause the program to reach the vulnerability.

In some exemplary embodiments, the input analysis platform may utilize an initial predictive model that is configured to predict whether an input would cause the program to reach one or more vulnerabilities. The one or more vulnerabilities may or may not comprise vulnerability that the predictive model is trained based on. When the predictive model is provided to the input analysis platform, it may replace the initial predictive model. In response to the replacement, the input analysis platform may utilize the predictive model instead of the initial predictive model, to perform predictions of whether an input would cause the program to the vulnerability. In some exemplary embodiments, the predictive model may be a refinement of the initial predictive model. The predictive model may be configured to predict whether an input would cause the program to reach the one or more vulnerabilities or the vulnerability. In some exemplary embodiments, the predictive model may be trained based on the initial predictive model in addition to the set of variant inputs and labels thereof. Additionally or alternatively, the initial predictive model may be trained based on an initial training set. The initial training set may comprise labeled inputs. Each labeled input may be labeled with either a vulnerable label or a non-vulnerable label, based on whether an execution of the program with the labeled input reaches one of the one or more vulnerabilities. Training the predictive module may be performed based on an augmented training set comprising a combination between the initial training set and the set of variant inputs and labels thereof.

In some exemplary embodiments, in response to obtaining an input by the input analysis platform, and prior to executing the program with the input, the input analysis platform may predict, using the predictive model, whether the program, when executed with the input, would reach the vulnerability. In some exemplary embodiments, the input analysis platform may determine a responsive action based on the prediction. The input analysis platform may perform the responsive action, prior to executing the program with the input. Additionally or alternatively, the responsive action may be carried out by a response system. As an example, if the input is predicted to be safe (i.e. do not cause the program to reach the vulnerability), the responsive action may be to pass the input and to provide it for execution by an execution system. Alternatively, if the input is predicted to be vulnerable, the responsive action may be blocking the input, issuing a report, deceiving by rerouting to a honeypot, throttling the program, or the like.

In some exemplary embodiments, the predictive model may be configured to determine a confidence level of each prediction. The responsive action may performed based on the confidence level. As an example, the input may be blocked if the confidence level is above 70%, 80%, 90%, or the like.

In some exemplary embodiments, the predictive model may be provided to multiple instances of the input analysis platform. In some exemplary embodiments, the predictive model may be deployed to all instances of the program, thereby protecting all such instances, and not just a single instance of the program. Additionally or alternatively, a single input analysis platform may be utilized to protect multiple instances of the program by serving as a gateway to multiple servers having the program installed thereon.

In some exemplary embodiments, the variant inputs may be generated using fuzz testing. Fuzz testing may be a software testing technique that involves testing the program by providing invalid, unexpected, or random data as input. The program may be then monitored for exceptions such as reaching vulnerabilities, crashes, failing built-in code assertions, for finding potential memory leaks, or the like. Fuzz testing may be automated, semi-automated, or the like. Fuzz testing may be employed as white-, grey-, or black-box generating technique of new inputs. In fuzz testing, the sample input may be "fuzzed" to generate multiple variant inputs. In some exemplary embodiments, the fuzz testing may be performed based on a generation-based fuzzing. Generation-based fuzzing may generate new variant inputs based on a generation model that is based on the sample input. As an example, variant inputs with the same structure as the sample input may be generated using a model thereof. In some exemplary embodiments, a Constraint-Based Random Stimuli Generation may be performed using a Constraint Satisfaction Problem (CSP) solver for generating the inputs, such as is disclosed by Naveh, Yehuda, et al. "Constraint-based random stimuli generation for hardware verification." AI magazine 28.3 (2007): 13, which is hereby incorporated by reference in its entirety for all purposes and without giving rise to disavowment. In some exemplary embodiments, a minimal number of variant inputs may be generated based on the sample input. Variant inputs that cause the program to reach the vulnerability may be preserved, and more variant inputs may be generated based upon such inputs, such as by modifying the model based upon which the inputs are generated.

Additionally or alternatively, the variant inputs may be generated by determining genetic mutations of the sample input. The sample input may be represented as a sequence of elements, each of which is considered as a "gene". In some exemplary embodiments, the element may be, as a non-limiting example, a bit, a set of bits representing a variable, or the like. A genetic mutation may be performed on the sequence to create a new sequence representing an alternative input. Different kinds of genetic mutations may be performed on the sample input or on mutated alternative inputs to generate new variant inputs. As a non-limiting example, a base substitutions mutation may be performed by substituting bits in the sample input. As another non-limiting example, an insertion/deletion mutation may be performed on the sample input, by inserting or deleting one or more bits in the sample input. Yet, another non-limiting example of a mutation may be a "cross-over" mutation in which two parts of two different inputs are swapped to generate two new variant inputs.

Additionally or alternatively, the variant inputs may be generated by performing concolic execution of one or more alternative branching decisions than the decisions caused by the sample input. Each alternative branching decision may reflect a change in the sample input to create a variant input. As an example, if an alternative branching decision is carried out by changing a value of an element in the sample input, a variant input may be generated with the changed value. Using concolic execution, the generation and execution of the alternative inputs may be performed in a unified manner Using symbolic values obtained during the concolic execution, alternative inputs which would cause the same branching decisions may also be generated and used.

Another technical problem dealt with by the disclosed subject matter may be to identify features that can be extracted from inputs and that are useful for generating the predictive model. In some cases, each element of the input may be considered as a potential feature. However, many features may prove to be irrelevant or redundant to the prediction task set out for the predictive model.

Another technical solution is to perform feature learning. In some exemplary embodiments, feature learning may be performed over the set of variant inputs, to automatically identify a vector of features representing inputs to be used by the machine learning modules. The feature learning may be performed based on the sample input and information provided about the sample input during generation of the variant inputs process (e.g., the mutation performed in genetic fuzz testing that created a variant input reaching the vulnerability), information provided by the auto-encoder neural network or the like. In some exemplary embodiments, pairs of inputs may be obtained, either by comparing the pairs after each input is created or by method of production thereof. The pairs may differ at a valuation of a single element from one another, and may be labeled differently. As a result, the single element may be considered as a feature that is potentially relevant to the vulnerability classification. In some exemplary embodiments, inputs that differ at valuation of a set of elements may also be paired and analyzed, where the sets of elements may be considered as a feature themselves. The set of elements may or may not be encoded to a single element.

Based on the vector of features defined by the feature learning, feature extraction may be performed for each variant input. Feature extraction may determine a valuation of the vector of features for each variant input. The predictive model may be trained based on pairs of valuations of the vector of features of a variant input and the label of the variant input. During the prediction phase, a valuation of the vector of features of the input may be fed to the predictive model to provide a predicted classification thereof.

One technical effect of utilizing the disclosed subject matter is to reduce the risk on vulnerable systems and to provide faster protection, once a new vulnerability is detected.

Another technical effect of utilizing the disclosed subject matter is to prevent exploitation of the vulnerability without requiring code change of the program. Code change may often introduce additional bugs and therefore provide for additional vulnerabilities to the program.

Yet another technical effect of utilizing the disclosed subject matter is to prevent exploitation of the vulnerability in systems where update is impractical or undesired. For example, where the exploit is based on a flawed hardware design, removing the vulnerability is impossible as it requires hardware replacement. As another example, stability considerations may lead system owners to avoid code update, such as the case with embedded system and mission-critical code.

Yet another technical effect of utilizing the disclosed subject matter is to provide an accurate prediction model. The prediction model may have relatively high accuracy due to the vector of features used to encode the classification problem. The vector of features is selected based on an observed difference caused due to a different valuation of a single element or a relatively small set of elements. The factor causing the observed different classification is deemed as a relevant feature for the prediction.

Referring now to FIG. 1 showing a schematic illustration of an exemplary environment in which the disclosed subject matter may be utilized, in accordance with some exemplary embodiments of the disclosed subject matter.

In some exemplary embodiments, a Fuzzing Platform 110 may be utilized to generate Labeled Tests 120 in which a label indicates whether or not a vulnerability is reached in a Program 102.

In some exemplary embodiments, a Program 102 may be obtained. Program 102 may be provided as an executable file. Additionally or alternatively, a source code of Program 102 may be provided. In some exemplary embodiments, the source code may be useful for performing analysis which may be useful for Fuzzing Platform 110, such as for improving static analysis that Static Analysis Module 119 is capable of performing in comparison to static analysis being performed solely based on the executable.

In some exemplary embodiments, one or more Sample Input 105 may be obtained by Fuzzing Platform 110. Sample Input 105, when provided to Program 102, may be configured to cause execution of Program 102 to reach a vulnerability. The vulnerability may compromise Program 102 and may potentially allow a malicious user to exploit the vulnerability for her malicious goals.

In some exemplary embodiments, Fuzzing Platform 110 may be utilized to generate a set of variant inputs by fuzzing Sample Input 105. Any type of input may be fuzzed, such as file formats, network protocols, environment variables, sequences of Application Program Interface (API) calls, keyboard and mouse events, contents of databases, content and address of a shared memory, particular interleaving of threads, or the like. Fuzzing Platform 110 may be configured to utilize a component to perform the fuzzing of Sample Input 105. The component responsible for creating the variant inputs based on Sample Input 105 may be a Model-Based Generator 112, a Genetic-Based Generator 114, a Concolic-Based Generator, a combination thereof, or the like.

In some exemplary embodiments, Fuzzing Platform 110 may be configured to generate inputs based on a coverage metric, such as code coverage metric, path coverage metric, branch coverage metric, or the like. Fuzzing Platform 110 may employ a heuristic approach to input generation to improve the score of the coverage metric. In some exemplary embodiments, generated inputs may be measured against the coverage model and used to update the heuristic. In some exemplary embodiments, the fuzz testing may be performed iteratively using different generators at different iterations based on the heuristic.

In some exemplary embodiments, Genetic-Based Generator 114 may be configured to generate variant inputs by mutating the sample input. Mutating the sample input may be performed by flipping bits at random locations in the sample input, moving blocks of bits within the sample input, or the like. Additionally or alternatively, Genetic-Based Generator 114 may employ other mutations. Additionally or alternatively, Genetic-Based Generator 114 may refer to other elements instead of bits. Fuzz testing that is performed using Genetic-Based Generator 114 may be referred to as genetic-based fuzzing.

In some exemplary embodiments, Concolic-Based Generator 116 may be configured to generate variant inputs by performing concolic execution of Program 102. Using Sample Input 105 as the concrete input, symbolic representation of input that would cause Program 102 to execute a same control flow path with the Control Flow Graph (CFG) may be determined. Such symbolic representation may be used to generate variant inputs that are labeled as vulnerable. Using symbolic representation of path conditions of a different control flow path, variant input that satisfies the path conditions and therefore follows the different control flow path, may be generated. The variant input may either be deemed as vulnerable or non-vulnerable depending on whether or not during the concolic execution, the vulnerability is reached based on the variant input. Fuzz testing that is performed using Concolic-Based Generator 116 may be referred to as concolic-based fuzzing.

In some exemplary embodiments, Model-Based Generator 112 may be configured to generate variant inputs based on a format of Sample Input 105 or based on other inputs, such as variant inputs, that cause Program 102 to reach the vulnerability. In some exemplary embodiments, based on the Sample Input 105, a generation model may be defined and utilized by a CSP-based generator. The generation model may comprise information about data structures in inputs, content of elements in the input, relationship of different elements in the input, or the like. In some exemplary embodiments, the generation model may be further based on information harvested from genetic-based fuzzing and/or concolic-based fuzzing. The harvested information may be used to define dictionaries and strategies embedded to the generation model. Fuzz testing that is performed using Model-Based Generator 112 may be referred to as generation-based fuzzing.

In some exemplary embodiments, Fuzzing Platform 110 may utilize a Static Analysis Module 119 to analyze Program 102. Static Analysis Module 119 may be configured to locate interesting focus areas of Program 102, such as error-prone sections of Program 102. The focus areas identified by Static Analysis Module 119 may be utilized as part of the search heuristic of Fuzzing Platform 110.

In some exemplary embodiments, variant inputs generated by Fuzzing Platform 110 may be executed by a Checker 117, to determine if execution of Program 102 reaches the vulnerability. Based on the execution outcome, a label for the variant input may be determined (e.g., vulnerable or non-vulnerable label). In some exemplary embodiments, Checker 117 may perform dynamic execution (e.g., actual execution of the binary of Program 102). Additionally or alternatively, Checker 117 may perform symbolic execution, concolic execution or other execution methods instead of dynamic execution.

In some exemplary embodiments, Labeled Tests 120 may be generated. Each labeled test may be a pair of a variant input and a label thereof. Labeled Tests 120 may comprise additional information regarding the variant inputs, such as information related to how these inputs were generated.

In some exemplary embodiments, Fuzzing Platform 110 may output Labeled Tests 120 to Learning Module 130. Learning Module 130 may utilize a Machine Learning Module 132 to train a predictive model (not shown) using Labeled Tests 120. In some exemplary embodiments, a supervised machine learning process may be used to train the predictive model. After the predictive model is created, it may be transmitted to Input Analysis Platform 140 and retained therein as Predictive Model 150.

It may be noted that in some exemplary embodiments, Fuzzing Platform 110 and Machine Learning Platform 130 may operate in an offline mode. The utilization of the predictive model and the decision making based thereon may be performed in an online mode, by the Input Analysis Platform 140.

In some exemplary embodiments, Predictive Model 150 may be provided to an Input Analysis Platform 140. Input Analysis Platform 140 may be a dynamic defensive system which may be deployed on a gateway to an Execution System 180 or may be integral part of the Execution System 180 itself. In both cases, inputs provided to Execution System 180 may pass through and be analyzed by the Input Analysis Platform 140, prior to actual execution by Execution System 180. Input Analysis Platform 140 may apply Predictive Model 150 on Input 142 prior to Input 142 being provided to Execution System 180. Predictive Model 150 may output a classification of Input 142 as safe or unsafe, prior to Execution System 180 executing the Program 102 with Input 142. Predictive Model 150 may determine whether Input 142 would cause Program 102 to reach the vulnerability. Additionally or alternatively, Predictive Model 150 may output a confidence score for the classification of Input 142. The confidence score may be a probability of the classification being correct (e.g. the estimated probability that a safe-labeled input would cause Program 102 to not reach the vulnerability and the estimated probability that an unsafe-labeled input would cause Program 102 to reach the vulnerability).

In some exemplary embodiments, the creation of Predictive Model 150 may be iterative. Input Analysis Platform 140 may utilize an initial predictive model that is configured to predict whether an input would cause the program to reach one or more vulnerabilities. The one or more vulnerabilities may or may not comprise the vulnerability analyzed in Fuzzing Platform 110. In case a new vulnerability is discovered, the initial model may be augmented to predict exploitation of the new vulnerability in addition to the previously known vulnerabilities. Additionally or alternatively, the vulnerability analyzed by Fuzzing Platform 110 may be a-priori known and referred to by the initial predictive model. However, a new input exploiting the vulnerability may be identified and analyzed to improve the prediction capabilities of the initial predictive model. In some exemplary embodiments, as fuzzing may be a time consuming process, it may be performed in phases, where after initial fuzzing is performed, the outcome of the initial fuzzing is used to generate a first predictive model to provide for an initial response to the exploit. In a consecutive phase, additional fuzzing is performed to improve the predictive capabilities for the same exploit. In such an embodiment, Predictive Model 150 used by Input Analysis Platform 140 is updated quickly to provide an initial defensive capabilities against newly discovered exploit using a coarse predictive model, while allowing for an improved, refined predictive model which would provide for better results, while requiring a longer computation time.

Machine Learning Platform 130 may refine the initial predictive model to generate an updated predictive model, which is provided to Input Analysis Platform 140. In response, Input Analysis Platform 140 may utilize the newly provided predictive model instead of the initial predictive model. Additionally or alternatively, Machine Learning Platform 130 may train Predictive Model 150 based on the initial predictive model. In such a case, Predictive Model 150 may be configured to predict whether an input would cause the program to reach the one or more vulnerabilities or the vulnerability analyzed in Input Analysis Platform 140. In some exemplary embodiments, the initial predictive model may be trained based on an initial training set. The initial training set may comprise labeled inputs. Each labeled input may labeled with either a vulnerable label or a non-vulnerable label, based on whether an execution of the program with the labeled input reaches one of the one or more vulnerabilities. Predictive Model 150 may be trained based on an augmented training set, which comprises the initial training set and outcome of Fuzzing Platform 110 (e.g., Labeled Tests 120).

In some exemplary embodiments, Learning Module 130 may utilize a Deep Learning Module 134 to perform feature learning and feature extraction. Features Learned by Deep Learning Module 134 may be utilized to determine the features to be used in encoding inputs into the Machine Learning Module 132. Deep Learning Module 134 may utilize different deep learning techniques such as but not limited to neural networks, to simplify the learning task. As an example, Deep Learning Module 134 may define a neural network which encodes an input and a relationship to the same input. By processing a plurality of inputs, the neural network may identify patterns and implicitly encode features useful to represent an input. Deep Learning Module 134 may translate tests into compact intermediate representations akin to principal components, and derive layered structures, which may remove redundancy in representation of the test. The compact intermediate representation may be view used as a set of features encoding a test to be processed by Machine Learning Module 134. In some exemplary embodiments, the compact intermediate representation may be used to represent the Labeled Tests 120 together with their labels for training purposes. Additionally or alternatively, the compact intermediate representation may be used to represent an Input 142 upon which the Predictive Model 150 is applied.

Additionally or alternatively, Learning Module 130 may utilize an Automatic Feature Encoder 136 to perform feature learning so as to automatically learn features to be used by Machine Learning Module 132 from Labeled Tests 120. Automatic Feature Encoder 136 may be configured to identify a vector of features representing Labeled Tests 120 to be used by Machine Learning Module 132. Automatic Feature Encoder 136 may be configured to perform feature learning based on Labeled Tests 120. Automatic Feature Encoder 136 may identify pairs of labeled tests that differ at a valuation of a single element, and are labeled differently. Automatic Feature Encoder 136 may consider the single element as a feature that is potentially relevant to the vulnerability classification. Automatic Feature Encoder 136 may perform a feature extraction for each labeled test based on the vector of features, by determining a valuation of the vector of features for each variant input. Machine Learning Module 132 may train the predictive model based on pairs of valuations of the vector of features of a labeled test and the label thereof.

In some exemplary embodiments, the pairs of labeled tests may be determined by construction. For example, using Genetic-Based Generator 114, a variant input that differs by a single element from another variant input may be generated as a part of the genetic generation technique. As a result, potential pairs may be identified by construction and determined based on the difference in labels. Additionally or alternatively, Concolic-Based Generator 116 may be used to create pairs of inputs that differ by a single element and have a different label. As an example, the path may be changed to avoid reaching the vulnerability thereby modifying the path condition. It may be possible to generate a different input that differs by a single element from an existing input which reaches the vulnerability and which holds the modified path condition. Similarly, an input not reaching the vulnerability may be modified to reach the vulnerability. Concolic-Based Generator 116 may utilize a solver, such as a CSP solver, a Boolean satisfiability problem (SAT) solver, a theorem prover, or the like, to generate such input holding the desired constraint. Additional methods of generating the pairs of labeled tests by construction may be utilized. Creating the pairs by construction may provide a performance improvement as otherwise each pair of inputs may need to be compared to identify whether they differ by a single element.

In some exemplary embodiments, prediction results of Predictive Model 150 may be fed into a Decision Making Unit 160. Decision Making Unit 160 may be configured to decide whether to pass Input 142 to Execution System 180 for executing or not. Decision Making Unit 160 may be configured to account for other considerations obtained Other Information Resources 165. Other Information Resources 165 may comprise additional predictive models configured to detect reaching additional vulnerabilities, other filtering mechanisms, such as a rule based systems configure to filter out unsafe inputs, or the like. Decision Making Unit 160 may be configured to decide on a responsive action based on the prediction results and the other considerations. In some exemplary embodiments, the responsive action may be any one or more actions from the following: pass, block, throttle, report, deceive by rerouting to a honeypot, or the like. As an example Decision Making Unit 160 may decide to pass Input 142 for execution, if Input 142 is classified as safe. As another example, if Input 142 is classified as unsafe and the confidence level is above a predetermined threshold, the responsive action may be to block Input 142. However, if the confidence level is below the threshold, the responsive action may be to pass Input 142 for execution while reporting Input 142. As yet another example, if from Other Information Resources 165 it is indicated that Input 142 is malicious, such as based on a high rate of communication packets received from a same device (e.g., based on IP address, MAC address, or other identifier thereof), any unsafe prediction may be handled by blocking the input, regardless of the confidence level. Additionally or alternatively, the confidence level threshold may be modified based on information received from Other Information Resources 165. Additionally or alternatively, Decision Making Unit 160 may decide to deceive a potential malicious user by rerouting to a honeypot, log Input 142 for future analysis, or the like.

In some exemplary embodiments, the responsive action may be performed by a Response System 170. Response System 170 may be configured to pass Input 142 to Execution System 180 if "pass" responsive action is determined, block Input 142 if "block" responsive action is determined, or performing any other responsive action determined by Decision Making Unit 160.

In some exemplary embodiments, Response System 170 may be configured to provide a feedback that may be used by a user to adapt Response System 170, Decision Making Unit 160, Predictive Model 150, or another filtering mechanisms.

Figure 2A:
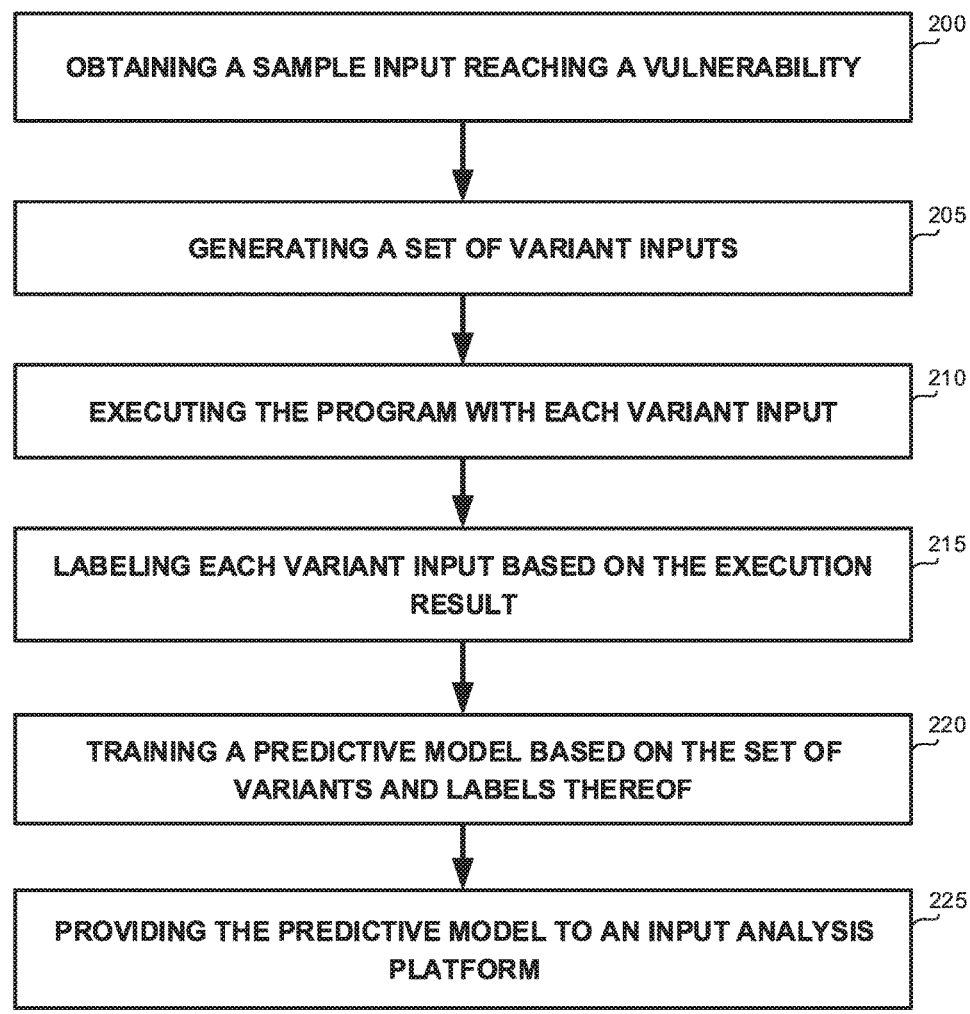
FIGS. 2A-2D show flowchart diagrams of methods, in accordance with some exemplary embodiments of the disclosed subject matter.

Referring now to FIG. 2A showing a flowchart diagram of a method, in accordance with some exemplary embodiments of the subject matter.

On Step 200, a sample input reaching a vulnerability may be obtained. The sample input, when provided to a program being executed, may cause execution of the program to reach the vulnerability. In some exemplary embodiments, the vulnerability may be detected by a checker when the sample input is executed. Additionally or alternatively, a user may provide the sample input and indicate the existence of the vulnerability. Additionally or alternatively, the vulnerability may be selected from a list of disclosed vulnerabilities in a system (e.g. Common Vulnerabilities and Exposures list, where vulnerability is scored using Common Vulnerability Scoring System (CVSS)) and the sample input may be automatically identified, such as during automated testing and verification.

On Step 205, a set of variant inputs may be generated based on the sample input. The set of variant inputs may be generated by providing invalid, unexpected, or random data similar to the sample input, as an input to the program. In some exemplary embodiments, the set of variant input may be generated by creating new inputs having the format of the sample input, such as having the same file format, the same elements, the same structure, or the like. Additionally or alternatively, new inputs may be generated by mutating the sample input to generate new inputs. Mutating the sample input may be performed by changing a value of one or more element in the sample input, changing a location of an element or a block of elements in the sample input, deleting one or more elements from the sample input, adding one or more elements to the sample input, or the like. Additionally or alternatively, new inputs may be generated by performing concolic execution of one or more alternative branching decisions of the program execution paths, than caused by the sample input. Values of elements in the sample input may be changed to invoke different executions paths reaching the vulnerability. Additionally or alternatively, concolic execution of the same path may be performed to identify other inputs that reach the vulnerability or other inputs that do not reach the vulnerability although they execute the same CFG path.

On Step 210, the program may be executed with each variant input in the set of variant inputs, to determine if execution of the program with the variant input reaches the vulnerability. In some exemplary embodiments, the program may be executed by a concrete execution. Additionally or alternatively, the program may be symbolically executed with each variant input. In such a symbolic execution, the program may be analyzed to determine what inputs cause each part of the program to execute. An interpreter may simulate the execution of program, assuming symbolic values for the variant inputs rather than obtaining actual values as a concrete execution of the program would. The interpreter may determine symbolic values for variables and expressions of the program, which use the symbolic values. Constraints on values of the symbolic values may be determine, such as based on the path conditions. The interpreter may then determine if the vulnerability is reached or not, using symbolic valuation of the symbolic values. In some cases, the concrete inputs which invoke the vulnerability and concrete inputs which do not invoke the vulnerability may be generated using the same symbolic expressions. Additionally or alternatively, the program may be executed by a concolic execution, that combines both symbolic execution and concrete execution. Additionally or alternatively, the execution may be performed by a model checker, such as BDD-based symbolic model checker, SAT-based symbolic model checker, explicit model checker, or the like, for formally verifying all executions of the program. The model checker may be used to generate counter-examples of inputs causing the program to either reach or not reach the vulnerability. It will be noted that in some cases, generation of variant inputs and execution thereof may be performed in uniform, such as when using a concolic-based generator (e.g., 116 of FIG. 1).

In some exemplary embodiments, Step 210 may report coverage information, such as coverage goal covered by the execution (e.g., an execution path in a path coverage), to a coverage model. The coverage model may be used in Step 205 for the generation in a manner directed to increase the coverage by the inputs of the coverage model. In some exemplary embodiments, based on a first input, a second input may be generated in a manner that may or may not affect its coverage (e.g., cause execution to invoke a different execution path). In some exemplary embodiments, genetic-based generation may be performed in such a manner Additionally or alternatively, concolic-based generation may be performed so as to cover each and every execution path according to the CFG of the program, thereby guaranteeing that each generated input invokes a new and unique execution path and therefore increases the coverage of the coverage model.

On Step 215, each variant input may be labeled as vulnerable or non-vulnerable based on the execution result. A label of each variant input may be determined based on whether the execution of the program with the variant input reaches the vulnerability. In some exemplary embodiments, the labeling may be based on an execution or may be performed during the execution, such as in case of an assertion based checking performed using a checker.

On Step 220, a predictive model may be trained based on the set of variants and labels thereof. In some exemplary embodiments, the predictive model may be trained to determine which data is useful and which data is not needed, to give accurate predictions. The set of variant inputs may be used as a training data set to build the predictive model. A test set comprising inputs from the set of variant inputs may used to validate the predictive model, after training thereof without the test set.

In some exemplary embodiments, an initial training set may be utilized prior to Step 220 to train an initial predictive model. The initial predictive model may be configured to predict whether an input would cause the program to reach one or more vulnerabilities. The one or more vulnerabilities may not necessarily comprise the vulnerability currently being analyzed. The initial training set may comprise labeled inputs, each of which may be labeled with either a vulnerable label or a non-vulnerable label, based on whether an execution of the program with the labeled input reaches one of the one or more vulnerabilities. The predictive model may be trained based on an augmented training set comprising the initial training set and the set of variant inputs and labels thereof. Additionally or alternatively, the initial predictive model may be refined and re-trained using the set of variants and labels thereof. In some exemplary embodiments, the refinement of the initial predictive model may be performed without re-using the initial training set. In some exemplary embodiments, the predictive model may be configured to predict whether an input would cause the program to reach the one or more vulnerabilities or the vulnerability.

On Step 225, the predictive model may be provided to an input analysis platform configured to analyze inputs provided to the program, prior to executing the program with the inputs. The predictive model may enable the input analysis platform to predict whether an input would cause the program to reach the vulnerability prior to executing the program with the input. In some exemplary embodiments, the predictive model may be provided to multiple instances of the input analysis platform. In some exemplary embodiments, the predictive model may be transmitted over a computerized network to each of instance of the input analysis platform. Each instance of the input analysis platform may receive the predictive model and store it to be used by the input analysis platform during execution.

In some exemplary embodiments, the input analysis platform may be configured to provide inputs predicted to be non-vulnerable to an execution system configured to execute the program. It may be appreciated that in some exemplary embodiments, the input analysis platform may be integrated in the execution system and may be non-separable component thereof.

In some exemplary embodiments, the initial predictive model may be utilized by the input analysis platform prior to Step 225. The predictive model may replace the initial predictive model and the input analysis platform may utilize the predictive model instead of the initial predictive model.

In some exemplary embodiments, Steps 205, 210, 215, 220, 225 may be performed repeatedly, so as to provide incremental improvements of the predictive model in reasonable timeframes. For example, the generation process may take a long time. However, after one hour of generation, the generated inputs may be used to train the predictive model and create a first predictive model. After additional inputs are generated (e.g., in a second hour), a second predictive model may be created based on all the inputs generated thus far. It will be appreciated that any timeframe for an iteration may be defined by a user based on her preferences.

In some exemplary embodiments, On Step 220, the predictive model may be further trained based on the initial predictive model. It may be noted that the predictive may be retrained periodically with new variant input sets to adjust for new discovered vulnerabilities.

It may be appreciated that in some exemplary embodiments, Steps 210, 215 and 220 may be performed by the input analysis platform.

Figure 2B:
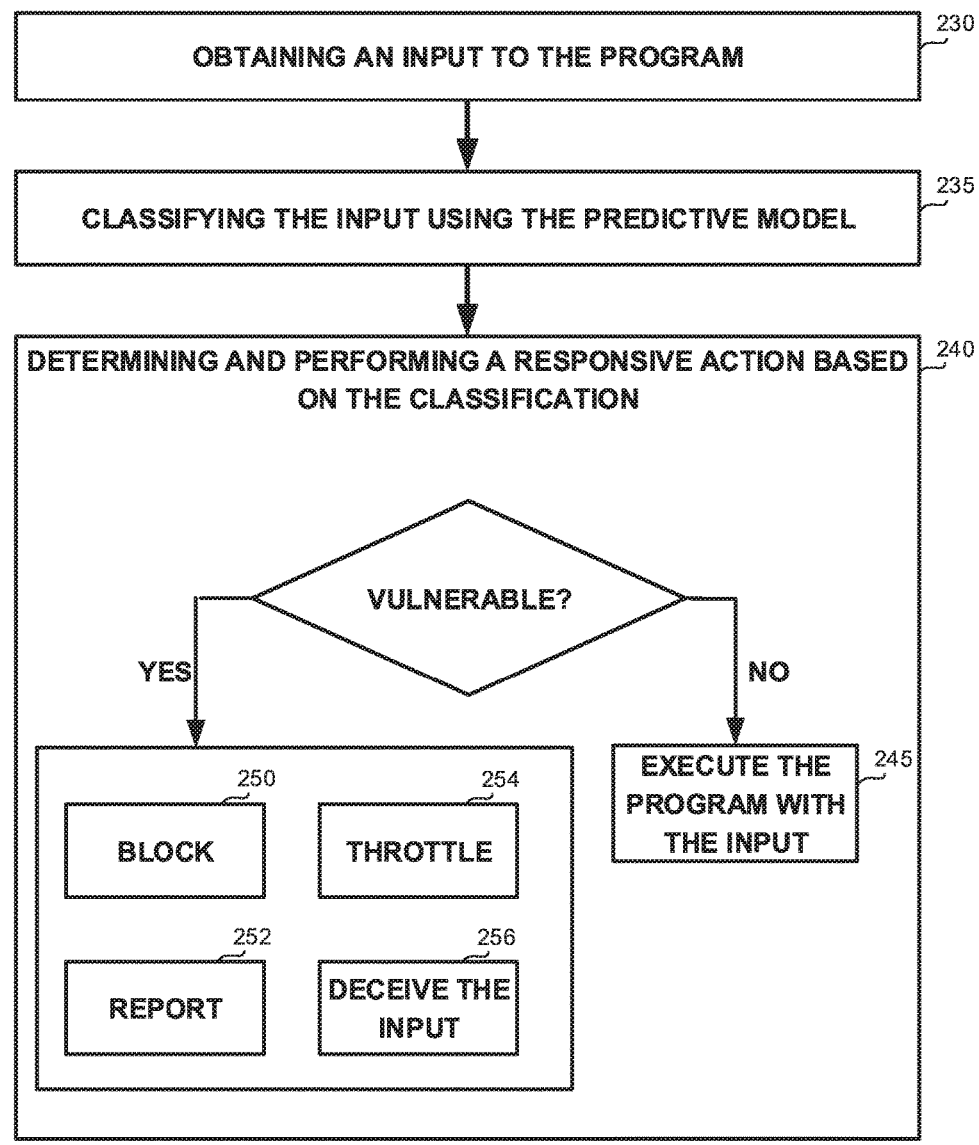

Referring now to FIG. 2B showing a flowchart diagram of a method, in accordance with some exemplary embodiments of the subject matter.

On Step 230, an input to the program may be obtained by the input analysis platform. In some exemplary embodiments, the input may be a transaction to invoke the program, such as an HTTP packet, or other electronic communication invoking the operation of the program. Additionally or alternatively, the input may be keyboard strokes, mouse input, or other user-input provided using a peripheral device or input device, clock readings, or the like.

On Step 235, the input may be classified using the predictive model. In some exemplary embodiments, the input analysis platform may apply the predictive model to predict, whether the program, when executed with the input, would reach the vulnerability. The input may be classified as vulnerable or non-vulnerable. An expected execution outcome of providing the input to the program may obtained by the input analysis platform, prior to execution of the program with the input. In some exemplary embodiments, the predictive model may be a model that was obtained as is depicted in FIG. 2A.

In some exemplary embodiments, a confidence level of the prediction may be determined based on the predictive model. The confidence level may be a probability of the input being vulnerable or non-vulnerable according to the predictive model, which may be provided as a number between 0 and 1.

On Step 240, a responsive action may be determined and performed based the prediction of Step 230. In some exemplary embodiments, said determining may be performed prior to executing the program with the input. As an example, if the input is classified as non-vulnerable (i.e. does not cause execution of the program to reach the vulnerability), the responsive action may be to provide the input for execution (Step 245). In some exemplary embodiments, the responsive action may be determined based on the confidence level of the prediction. As an example, Step 245 may be performed only if the input is classified as non-vulnerable, and the confidence level is above a predetermined threshold, such as above 80%, 90%, or the like.

On Step 245, the program may be provided to an execution system to be executed with the input. In some exemplary embodiments, the execution may be deemed as safe based on the prediction. In some cases, the execution outcome may be compared to the prediction, so as to allow to improve the prediction of the predictive model.

If the input is classified as vulnerable, the responsive action may be to block the input and prevent execution (250), throttle input to the system (254), log and report the input (252), perform a deception such as rerouting to a honeypot (256), or the like.

On Step 250, the input may be blocked and execution of the program with the input may be prevented. Step 250 may be performed if the input is classified as vulnerable with a confidence level above a second predetermined threshold. The second predetermined threshold may the same as the predetermined threshold for providing the input for execution, less than the predetermined threshold for providing the input for execution, or the like.

Additionally or alternatively, On Step 252, the input may be reported as possibly reaching the vulnerability. The input may be recorded in a log allowing for user-review at a later time. In some exemplary embodiments, a report may be submitted to an administrator for her review. In some exemplary embodiments, the administrator may review the report and decide on an appropriate responsive action, such as blocking the input, executing the program, or the like. In some exemplary embodiments, the reported input may be provided to fuzzing platform, such as 110 of FIG. 1. The fuzzing platform may utilize the reported input as a sample input for fuzz testing. Additionally or alternatively, the fuzzing platform may execute the program with the reported input to determine whether or not the input does reach the vulnerability, thereby identify false positive reports. Based on the detection of false positive reports, the prediction model may be improved to exclude the false positive instance, thereby improving the prediction capabilities of a system in accordance with the disclosed subject matter.

On Step 254, throttling may be performed. In some exemplary embodiments, the input analysis platform might limit, or throttle, the rate at which it accepts data, in order to avoid overloading its processing capacity. In some exemplary embodiments, throttling may be performed in order to prevent Denial of Service (DoS) attack, based on an indication that the input is attempting to exploit a vulnerability related to the DoS attack. In some exemplary embodiments, the throttling may be associated with the input and other vulnerable-classified input and not with non-vulnerable input.

On Step 256, the input may rerouted to a honeypot. The honeypot may simulate operation similar to that of the program, so as to prevent a malicious user from identifying that the input was rerouted. The honeypot may log information useful for tracking the malicious user and mitigating the risk she possess to the input analysis platform in the future.

In some exemplary embodiments, any combination of the steps 250, 252, 254, 256 may be performed. The selection of the step(s) to perform may be based on rules and user-defined preferences, as well as on the confidence level of the prediction.

Figure 2C:
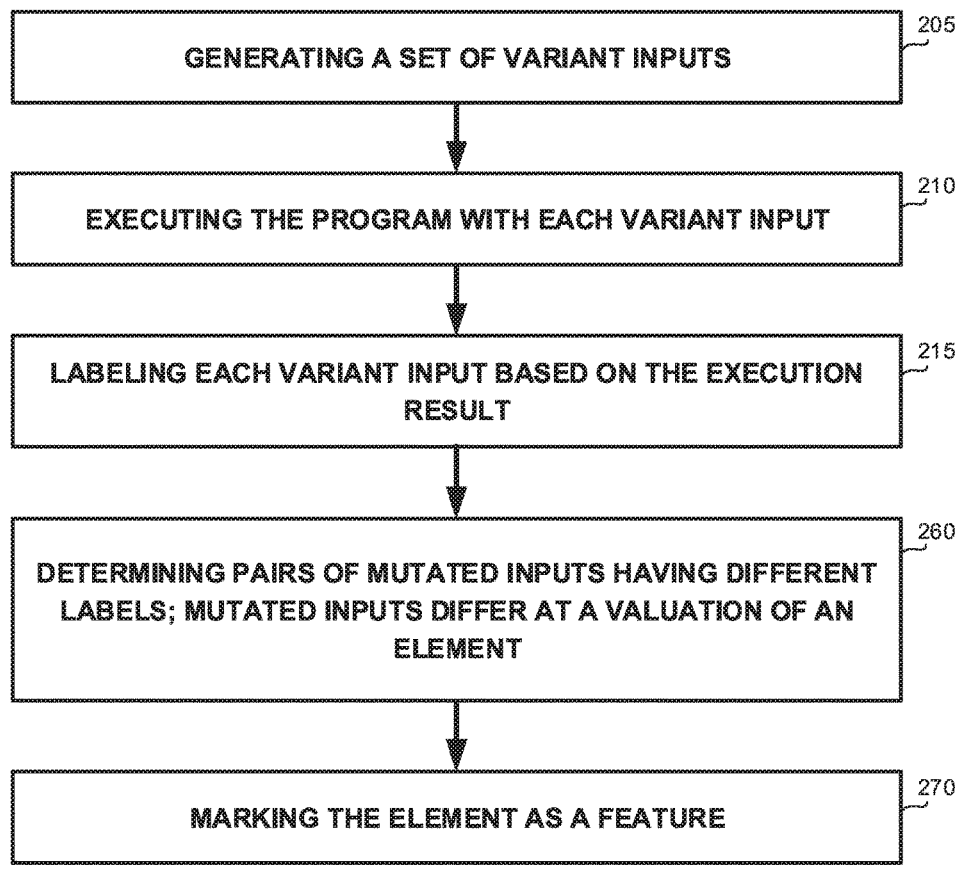

Referring now to FIG. 2C showing a flowchart diagram of a method, in accordance with some exemplary embodiments of the subject matter.

After variant inputs are generated and labeled (205, 210, 215), Step 260 may be performed. On Step 260, pairs of inputs having different labels and differing in a valuation of one element may be determined. In some exemplary embodiments, the pairs may be determined by construction, such as using concolic-based generation, using genetic-based generation, or the like. Additionally or alternatively, the pairs may be identified from the set of variant inputs by comparing the different inputs and identifying pairs of inputs that differ by a single element and have different labeling. In some exemplary embodiments, in case the number of pairs of inputs is below a minimal threshold, pairs of inputs which differ in their label and in two elements may be added to the set of pairs. Additionally or alternatively, the number of elements which can differ may be increased until a minimal threshold size of the set of pairs is reached.

On Step 270, the one or more elements that differ between each pair of inputs may be marked as a feature useful for encoding in a meaningful manner inputs for the prediction engine. In some exemplary embodiments, the selected features may be used on Step 220 to train the predictive model, and on Step 235 to classify input received for execution by the input analysis platform.

Figure 2D:
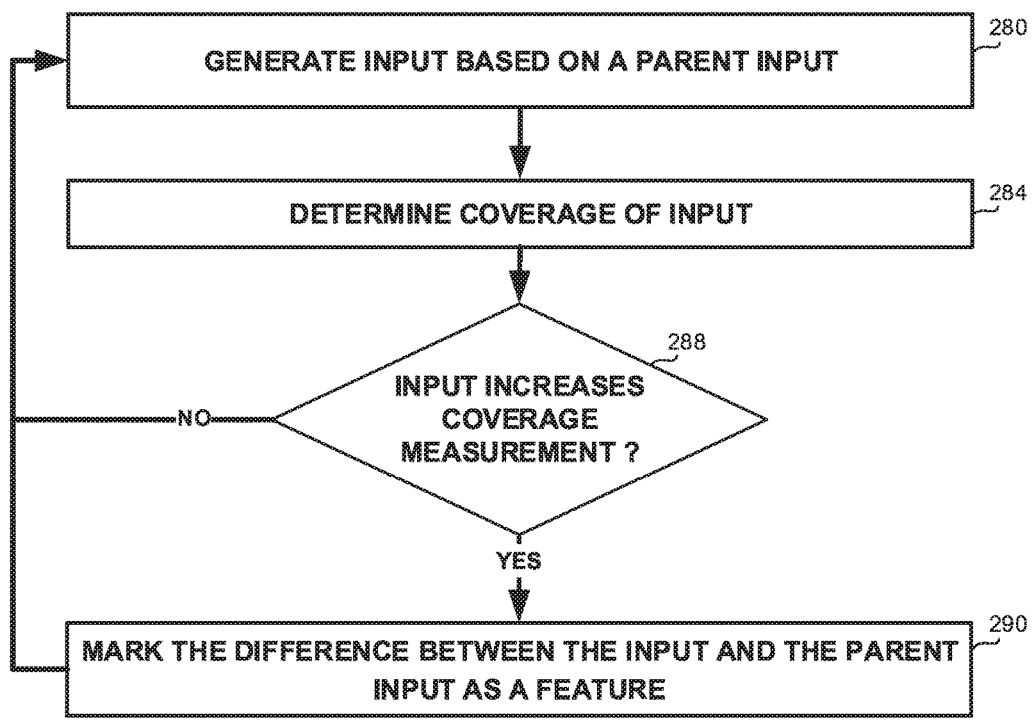

Referring now to FIG. 2D showing a flowchart diagram of a method, in accordance with some exemplary embodiments of the subject matter.

On Step 280, an input may be generated based on a parent input. In some exemplary embodiments, the input may be generated using one of the methods performed on Step 205. In some exemplary embodiments, Step 280 may be a part of Step 205. In some exemplary embodiments, the parent input may provide a first coverage (e.g., covering one execution path in the CFG). The newly generated input may be generated so as to provide a different coverage (e.g., cover a different execution path in the CFG). It will be noted that in some cases, the newly generated input may provide a different coverage than the parent coverage, but will not increase the overall coverage measurement. For example, the newly generated input may cover an execution path that was previously covered by a different input other than the parent input. In some exemplary embodiments, based on the manner of generation and depending on the coverage metric, the generation may guarantee increasing the coverage measurement, such as in case of using concolic-based generation and when measuring path coverage.

On Step 284, a coverage of the input according to a coverage metric may be determined. The coverage metric may be defined a predetermined coverage model, and may be any coverage metric. As an example, a measurement of the coverage may be a percentage of the instructions of the program invoked during the execution. Additionally or alternatively, the coverage may be measured according to a loop coverage (e.g. the number of times a possible loop been executed), an entry/exit coverage (e.g. possible call and return of a function been executed), path coverage (e.g., a coverage of all potential execution paths according to the CFG), or the like.

On Step 288, a determination whether the input increases coverage measurement may be made. In some exemplary embodiments, the determination may be made by comparing the coverage of the input with a coverage of the parent input. As an example, the input may exercise a different execution path than the parent input. It will be noted that in some cases, the method of generation may guarantee that the coverage measurement is increased. In some exemplary embodiments, the determination may be omitted, as long as a difference in coverage is gained between the newly generated input and its parent.

In case no increase is determined in the coverage, Step 280 may be repeated to generate a new input based on the input as its parent, based on the parent input, or the like.

On Step 290, in case an increase in the coverage is determined on Step 288, the difference between the input and the parent input may be marked as a feature useful for encoding in a feature used by the prediction engine. The difference may be identified in one or more elements of the input, and such one or more elements may be used as a feature. In some exemplary embodiments, the marked features may be used on Step 220 to train the predictive model, and on Step 235 to classify input received for execution by the input analysis platform.

Figure 3:
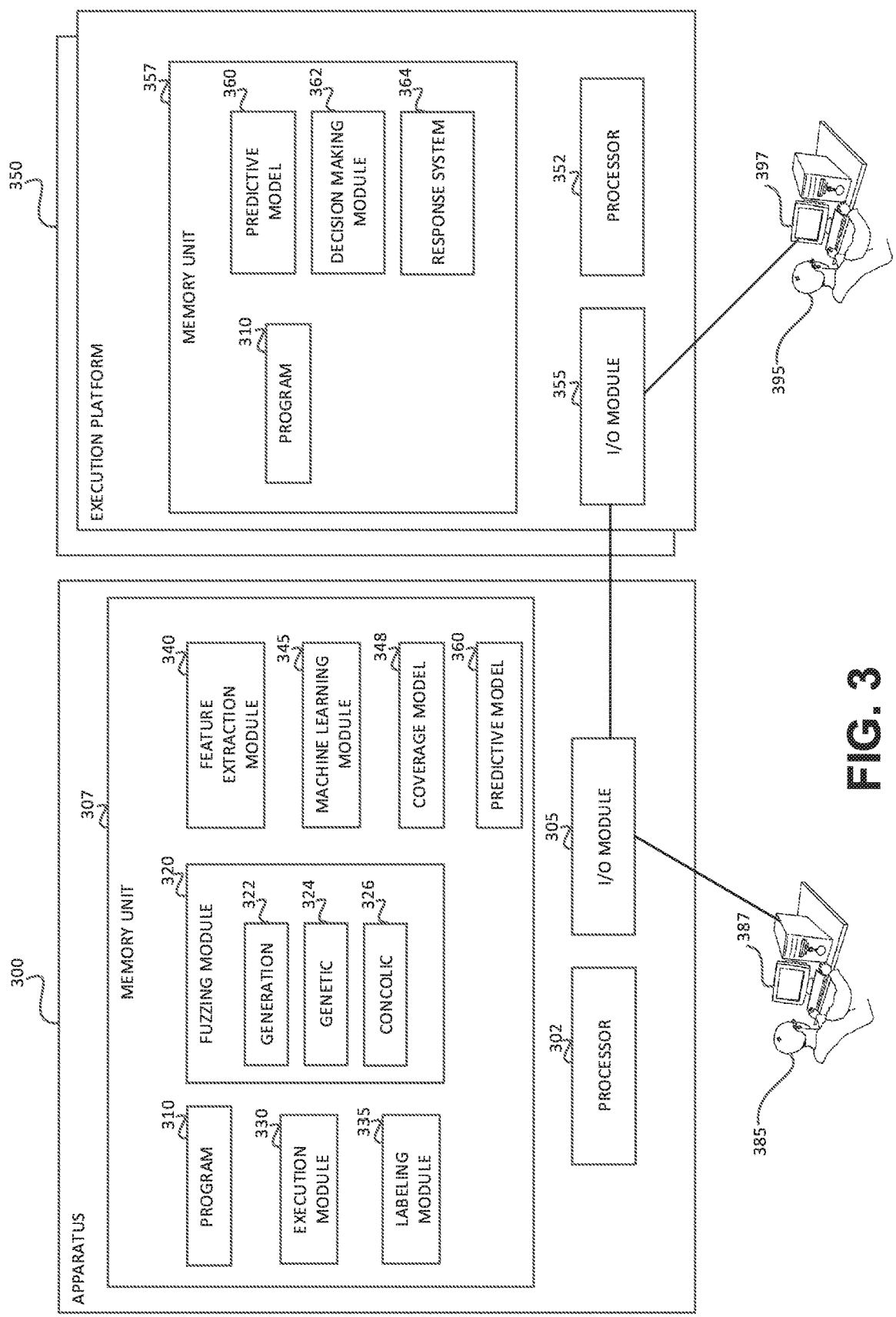
FIG. 3 shows a block diagram of an apparatus, in accordance with some exemplary embodiments of the disclosed subject matter.

Referring now to FIG. 3 showing a block diagram of an apparatus in accordance with some exemplary embodiments of the disclosed subject matter.

In some exemplary embodiments, an Apparatus 300 may comprise one or more Processor(s) 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) Module 305. Apparatus 300 may utilize I/O Module 305 as an interface to transmit and/or receive information and instructions between Apparatus 300 and external I/O devices, such as a Workstation 387, Execution Platform 350, or the like. In some exemplary embodiments, I/O Module 305 may be utilized to provide an output to and receive input from a User 385, such as, for example receiving source code, binary file, input files, vulnerabilities, test files, configurations and threshold preferences, or the like; and providing output files, predictive models, training data, or the like.

In some exemplary embodiments, I/O Module 305 may be used to obtain a sample input, that when provided to a Program 310, is configured to cause execution of Program 310 to reach a vulnerability. User 385 may provide the sample input, the vulnerability, or the like, such as via Workstation 387. It will be appreciated that Apparatus 300 can operate automatically without human intervention.

In some exemplary embodiments, Apparatus 300 may comprise a Memory Unit 307. Memory Unit 307 may be a hard disk drive, a Flash disk, a Random Access Memory (RAM), a memory chip, or the like. In some exemplary embodiments, Memory Unit 307 may retain program code operative to cause Processor 302 to perform acts associated with any of the subcomponents of Apparatus 300.

In some exemplary embodiments of the disclosed subject matter, Memory Unit 307 may comprise a Fuzzing Module 320. Fuzzing Module 320 may be configured to generate a set of variant inputs based on the sample input. In some exemplary embodiments, Fuzzing Module 320 may utilize a Generation-Based Fuzzer 322 to generate new inputs based on the sample input. Generation-Based Fuzzer 322 may be configured to generate new inputs based on a generation model consistent with the sample input. Additionally or alternatively, Fuzzing Module 320 may utilize a Genetic-Based Fuzzer 324 to generate new inputs based on the sample input. Genetic-Based Fuzzer 324 may be configured to generate new inputs by performing genetic mutations on the sample input, such as substitution mutations, insertions, deletions, amplifications, cross over, or the like. Additionally or alternatively, Fuzzing Module 320 may utilize a Concolic-Based Fuzzer 326 to generate new inputs based on the sample input. Concolic-Based Fuzzer 326 may be configured to generate new inputs by performing concolic execution having the same or different execution path than the execution path caused by the sample input.

In some exemplary embodiments of the disclosed subject matter, Memory Unit 307 may comprise an Execution Module 330. Execution Module 330 may be configured to execute Program 310 with each variant input generated by Fuzzing Module 320, to determine if execution of Program 310 with the variant input would reach the vulnerability. Additionally or alternatively, Execution Module 330 may be utilized by Concolic-Based Fuzzer 326 to perform concolic execution of one or more branching decisions than caused by the sample input. Execution Module 330 may be configured to perform different types of executions, such as but not limited to concrete execution, concolic execution, symbolic execution, model checking, or the like.

In some exemplary embodiments of the disclosed subject matter, Memory Unit 307 may comprise a Labeling Module 335. Labeling Module 335 may be configured to label each variant input as vulnerable or non-vulnerable based on the result of executing Program 310 with the variant input by Execution Module 330.

In some exemplary embodiments of the disclosed subject matter, Memory Unit 307 may comprise a Machine Learning Module 345. Machine Learning Module 345 may be configured to generate a Predictive Model 360 based on the set of variant inputs and labels thereof. In some exemplary embodiments, Machine Learning Module 345 may train Predictive Model 360 based on an initial predictive model. The initial predictive model may be utilized prior to obtaining the vulnerability, to predict whether an input would cause Program 310 to reach one or more vulnerabilities. The initial predictive model may be previously generated by Machine Learning Module 345, provided from an external resource by I/O Module 305, obtained from Execution Platform 350 by I/O Module 305, or the like. In some exemplary embodiments, Predictive Model 360 may be trained to predict whether an input would cause Program 310 to reach the vulnerability or the one or more vulnerabilities. Additionally or alternatively, Machine Learning Module 345 may be configured to train a Predictive Model 360 based on an augmented training set. The training set may comprise the set of variant inputs and labels thereof, and an initial training set that was previously used to train the initial predictive model, or other predictive models configured to predict whether inputs would cause Program 310 reaching vulnerabilities. The initial training set may be retained by an internal database of Memory Unit 307 (not shown), obtained by I/O Module 305, or the like.

In some exemplary embodiments of the disclosed subject matter, Feature Extraction Module 340 may be configured to reduce the set of variant inputs and labels thereof to a vector of features intended to be informative and non-redundant. The selected features may be expected to contain the relevant information from the variant inputs set and labels, so that the desired task can be performed by using this reduced representation instead of the complete initial set. Feature Extraction Module 340 may be configured to determine pairs of variant inputs having different labels. Each pair of variant inputs may differ at a valuation of an element. Feature Extraction Module 340 may select the element as a feature. Machine Learning Module 345 may train Predictive Model 360 based on pairs of valuations of the vector of features of a variant input and the label of the variant input. Additionally or alternatively, classification of an input by Execution Platform 350 may also be based on valuations of the vector of features automatically identified by Feature Extraction Module 340.

In some exemplary embodiments, Feature Extraction Module 340 may utilize a Coverage Model 348 to determine pairs of variant inputs having different coverage. Each pair of variant inputs may differ at a valuation of an element and invoke a different coverage path according to Coverage Model 348. Feature Extraction Module 340 may select the element as a feature. In some exemplary embodiments, Coverage Model 348 may be a coverage metric such as code coverage metric, path coverage metric, branch coverage metric, or the like.

In some exemplary embodiments, Coverage Model 348 may be utilized by Fuzzing Module 320, to generate inputs based upon. Fuzzing Module 320 may be configured to generate inputs that improve the coverage according to Coverage Model 348. In some exemplary embodiments, generated inputs may be measured against Coverage Model 348 and used to update the generation techniques.

In some exemplary embodiments of the disclosed subject matter, one or more execution platforms, such as Execution Platform 350, may be configured to execute Program 310, or other programs, with obtained inputs. Execution Platform 350 may comprise one or more Processor(s) 352, similar to Processor 302, which be utilized to perform computations required by Execution Platform 350 or any of it subcomponents. In some exemplary embodiments, Execution Platform 350 may be logically implemented by two separate entities: an input analysis platform and an execution system. Such entities may be implemented on a same device or on different devices, such as different servers.

In some exemplary embodiments of the disclosed subject matter, Execution Platform 350 may comprise an Input/Output (I/O) Module 355, similar to I/O Module 305. Execution Platform 350 may utilize I/O Module 355 as an interface to transmit and/or receive information and instructions between Execution Platform 350 and external I/O devices, such as a Workstation 397, Apparatus 300, or the like. In some exemplary embodiments, I/O Module 355 may be used to allow Execution Platform 350 to communicate over a computerized network. In some exemplary embodiments, I/O Module 355 may be utilized to provide an output to and receive input from a User 395, such as, for example receiving systems source code, input files, test files, predictive models or the like; and providing output files, reports, warnings, training data, or the like. I/O Module 355 may be used to provide an input to Program 310. User 395 may use Workstation 397 to provide the input. It will be appreciated that Execution Platform 350 can operate automatically without human intervention.

In some exemplary embodiments, Execution Platform 350 may comprise a Memory Unit 357, similar to Memory Unit 307. In some exemplary embodiments, Memory Unit 357 may retain program code operative to cause Processor 352 to perform acts associated with any of the subcomponents of Execution Platform 350, such as Program 310.

In some exemplary embodiments, Execution Platform 350 may utilize Predictive Model 360 to predict whether an input would cause Program 310 to reach a vulnerability, prior to executing Program 310 with the input. Predictive Model 360 may be provided by Apparatus 300 via I/O Module 355. Additionally or alternatively, Predictive Model 360 may be trained by Execution Platform 350. In some exemplary embodiments, Predictive Model 360 may be configured to determine a confidence level of its predictions. In some exemplary embodiments, Predictive Model 360 determined by Apparatus 300 may be electronically transmitted and distributed to plurality of instances of Execution Platform 350.

In some exemplary embodiments, Predictive Model 360 may be periodically replaced to provide improved predictions based on an augmented training set, such as relating to previously identified vulnerabilities which may be further investigated and analyzed by Apparatus 300, or relating to newly discovered vulnerabilities.

In some exemplary embodiments, Memory Unit 357 may comprise Decision Making Module 362. Decision Making Module 362 may be configured to decide whether to execute Program 310 with an input, based on a classification of the input by Predictive Model 360. In some exemplary embodiments, Decision Making Module 362 may be configured to determine a responsive action to be carried out by a Response System 364 based on the classification of the input by Predictive Model 360. Response System 364 may be configured to execute Program 310 with the input, if the input is classified as not reaching the vulnerability, or to block it otherwise. Additionally or alternatively, Response System 364 may be configured to issue a report about the input to User 395. User 395 may determine a different responsive action based on the report. Additionally or alternatively, Response System 364 may perform throttling or deception to a honeypot, or invoke any alternative suitable responsive action to an identified risk, with or without taking into consideration the confidence level of the prediction.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   obtaining a sample input, wherein the sample input, when provided to a program being executed, is configured to cause execution of the program to reach a vulnerability;
   generating a set of variant inputs based on the sample input;
   for each variant input in the set of variant inputs:
      executing the program with the variant input, to determine if execution of the program reaches the vulnerability; and
      labeling the variant input as vulnerable or non-vulnerable based on a result of said executing;
   training a predictive model based on the set of variant inputs and labels thereof, wherein the predictive model is configured to predict for an input of the program whether the input causes the program to reach the vulnerability; and
   providing the predictive model to an input analysis platform configured to analyze a production input prior to execution thereof by the program, wherein the input analysis platform is configured to allow execution of the program with the production input based on a prediction of the predictive model for the production input; whereby the input analysis platform is enabled to predict whether an input would cause the program to reach the vulnerability prior to executing the program with the input.

2. The computer-implemented method of claim 1, wherein prior to said providing, the input analysis platform utilizes an initial predictive model, wherein the initial predictive model is configured to predict whether an input would cause the program to reach one or more vulnerabilities; wherein said providing comprises replacing the initial predictive model with the predictive model, whereby in response to said replacing, the input analysis platform utilizes the predictive model instead of the initial predictive model.

3. The computer-implemented method of claim 2, wherein said training is based on the initial predictive model, whereby the predictive model is configured to predict whether an input would cause the program to reach the one or more vulnerabilities or the vulnerability.

4. The computer-implemented method of claim 3, wherein the one or more vulnerabilities does not comprise the vulnerability.

5. The computer-implemented method of claim 1,
wherein the input analysis platform utilizes an initial predictive model, wherein the initial predictive model is configured to predict whether an input would cause the program to reach one or more vulnerabilities; wherein the initial predictive model is trained based on an initial training set, wherein the initial training set comprises labeled inputs, wherein each labeled input is labeled with either a vulnerable label or a non-vulnerable label, wherein a label of each labeled input is determined based on whether an execution of the program with the labeled input reaches one of the one or more vulnerabilities;
wherein said training the predictive model is based on an augmented training set, wherein the augmented training set comprises the initial training set and the set of variant inputs and labels thereof.

6. The computer-implemented method of claim 1, further comprising:
obtaining, by the input analysis platform, a second input to the program, wherein the second input is provided to be used in an execution of the program;
predicting, by the input analysis platform and using the predictive model, whether the program, when executed with the second input, would reach the vulnerability;
whereby an expected execution outcome of providing the second input to the program is obtained by the input analysis platform, prior to execution of the program with the second input.

7. The computer-implemented method of claim 6, further comprising:
determining, by the input analysis platform, a responsive action based on said predicting, wherein said determining is performed prior to executing the program with the second input;
performing, by the input analysis platform, the responsive action.

8. The computer-implemented method of claim 7,
determining a confidence level of a prediction determined by said predicting; and
wherein said determining the responsive action is performed based on the confidence level, whereby performing different responsive actions for different confidence levels.

9. The computer-implemented method of claim 7, wherein the responsive action comprises the input analysis platform providing the second input to an execution system, wherein the execution system is configured to execute the program with the second input.

10. The computer-implemented method of claim 1, wherein said providing comprises providing the predictive model to multiple instances of the input analysis platform.

11. The computer-implemented method of claim 1, wherein said generating is performed by fuzzing the sample input based on a coverage metric.

12. The computer-implemented method of claim 11, wherein said fuzzing is performed using a technique selected from a group consisting of: generation-based fuzzing; genetic-based fuzzing; and concolic-based fuzzing.

13. The computer-implemented method of claim 1, further comprising:
performing feature learning over the set of variant inputs, whereby a vector of features representing inputs is selected, wherein said performing the feature learning comprises:
determining pairs of variant inputs having different labels, wherein each pair of variant inputs differs at a valuation of an element; and
selecting the element as a feature;
wherein said training is performed based on pairs of valuations of the vector of features of a variant input and the label of the variant input.

14. The computer-implemented method of claim 1, further comprising:
performing feature learning over the set of variant inputs, whereby a vector of features representing inputs is selected, wherein said performing the feature learning comprises:
determining pairs of variant inputs having different coverages according to a coverage metric, wherein each pair of variant inputs differs at a valuation of an element; and
selecting the element as a feature;
wherein said training is performed based on pairs of valuations of the vector of features of a variant input and the label of the variant input.

15. The computer-implemented method of claim 1, further comprising:
obtaining, by the input analysis platform, a first production input;
in response to predicting, by the input analysis platform and using the predictive model, a non-vulnerable label for the first production input, executing the program with the first production input;
obtaining, by the input analysis platform, a second production input; and
in response to predicting, by the input analysis platform and using the predictive model, a vulnerable label for the second production input, preventing the program from executing the second production input,
whereby execution of the program with a specific input is contingent on a prediction that the specific input does not cause the program to reach the vulnerability.

16. A computerized apparatus having a hardware processor, the processor being configured to perform:
obtaining a sample input, wherein the sample input, when provided to a program being executed, is configured to cause execution of the program to reach a vulnerability;
generating a set of variant inputs based on the sample input;
for each variant input in the set of variant inputs:
executing the program with the variant input, to determine if execution of the program reaches the vulnerability; and
labeling the variant input as vulnerable or non-vulnerable based on a result of said executing;
training a predictive model based on the set of variant inputs and labels thereof, wherein the predictive model is configured to predict for an input of the program whether the input causes the program to reach the vulnerability; and
providing the predictive model to an input analysis platform configured to analyze a production input prior to execution thereof by the program, wherein the input analysis platform is configured to allow execution of the program with the production input based on a prediction of the predictive model for the production input; whereby the input analysis platform is enabled to predict whether an input would cause the program to reach the vulnerability prior to executing the program with the input.

17. A computer program product comprising a non-transitory computer readable storage medium retaining program instructions, which program instructions when read by a processor, cause the processor to perform a method comprising:

obtaining a sample input, wherein the sample input, when provided to a program being executed, is configured to cause execution of the program to reach a vulnerability;

generating a set of variant inputs based on the sample input;

for each variant input in the set of variant inputs:
  executing the program with the variant input, to determine if execution of the program reaches the vulnerability; and
  labeling the variant input as vulnerable or non-vulnerable based on a result of said executing;

training a predictive model based on the set of variant inputs and labels thereof, wherein the predictive model is configured to predict for an input of the program the input causes the program to reach the vulnerability; and providing the predictive model to an input analysis platform configured to analyze a production input prior to execution thereof by the program, wherein the input analysis platform is configured to allow execution of the program with the production input based on a prediction of the predictive model for the production input; whereby the input analysis platform is enabled to predict whether an input would cause the program to reach the vulnerability prior to executing the program with the input.

* * * * *